(12) United States Patent
Maeda

(10) Patent No.: US 9,729,080 B2
(45) Date of Patent: Aug. 8, 2017

(54) POWER SUPPLY CONTROL CIRCUIT AND POWER SUPPLY DEVICE

(71) Applicant: TDK Corporation, Minato-ku, Tokyo (JP)

(72) Inventor: Akira Maeda, Tokyo (JP)

(73) Assignee: TDK Corporation (JP)

( * ) Notice: Subject to any disclaimer, the term of this patent is extended or adjusted under 35 U.S.C. 154(b) by 214 days.

(21) Appl. No.: 14/645,824

(22) Filed: Mar. 12, 2015

(65) Prior Publication Data

US 2016/0064998 A1 Mar. 3, 2016

(30) Foreign Application Priority Data

Aug. 28, 2014 (JP) ................. 2014-173442

(51) Int. Cl.
*H02J 9/00* (2006.01)
*H02M 7/217* (2006.01)
*H02J 7/02* (2016.01)

(52) U.S. Cl.
CPC ............. *H02M 7/217* (2013.01); *H02J 7/022* (2013.01)

(58) Field of Classification Search
CPC ........... G05F 1/30; G05F 1/33; H02M 1/4208
USPC .................................................. 363/78, 84
See application file for complete search history.

(56) References Cited

FOREIGN PATENT DOCUMENTS

| JP | H01-303055 A | 12/1989 | | |
|---|---|---|---|---|
| JP | H07-281771 A | 10/1995 | | |
| JP | 2003308124 A | * 10/2003 | ............... | G05F 1/56 |
| JP | 2004-312799 A | 11/2004 | | |
| JP | 3683548 B2 | 8/2005 | | |
| JP | 2005-28713 A | 10/2005 | | |
| JP | 2005287131 A | * 10/2005 | ............... | H02M 3/00 |

* cited by examiner

*Primary Examiner* — Jared Fureman
*Assistant Examiner* — Fan He
(74) *Attorney, Agent, or Firm* — Harness, Dickey & Pierce, P.L.C.

(57) ABSTRACT

A power supply control circuit, which is connected to a stabilized direct current power supply having a pair of first and second output terminals and a pair of first and second remote sensing terminals, includes: a current detector configured to detect an output current that is supplied to a load from the stabilized direct current power supply, and to output a current detection voltage; a current difference output unit configured to output a current difference voltage corresponding to a voltage difference between the current detection voltage and a current setting voltage; and a control voltage generator configured to generate a control voltage and output the control voltage to the first remote sensing terminal so as to perform a constant current control operation. The current detector, the current difference output unit and the control voltage generator are operated by only the direct current voltage supplied by the auxiliary power supply.

8 Claims, 4 Drawing Sheets

POWER SUPPLY CONTROL CIRCUIT AND POWER SUPPLY DEVICE

CROSS-REFERENCE TO RELATED APPLICATION

This application claims priority to Japanese Patent Application No. 2014-173442 filed Aug. 28, 2014 which is hereby expressly incorporated by reference herein in its entirety.

BACKGROUND

The present invention relates to a power supply control circuit that is externally attached to a stabilized direct current (DC) power supply. The stabilized DC power supply has a pair of output terminals and a pair of remote sensing terminals. The power supply control circuit performs constant current control for the stabilized DC power supply. The present invention also relates to a power supply device that has the power supply control circuit and the stabilized DC power supply explained above.

As this kind of power supply control circuits, a power supply control circuit disclosed in Japanese Patent Number 3683548 has been known. This power supply control circuit controls a stabilized DC power supply in which a positive output terminal and a positive remote sensing terminal are connected. A load is connected between the positive output terminal and a negative output terminal of the stabilized DC power supply. Further, the power supply control circuit explained above has a resistor (a resistor for current detection) and an operational amplifier. The resistor is provided on a side of the negative output terminal and is connected to the load in series. The operational amplifier corresponds to a variable voltage source. Further, the above resistor has one terminal, which is located at a side of the load, connected to an inversion input terminal of the operational amplifier. An external control voltage (a first external control voltage) is input to a non-inversion input terminal of the operational amplifier (specifically, the external control voltage is input by being divided). A voltage of the resistor's other terminal, which is located at a side of the negative output terminal, is a reference voltage for the external control voltage. Further, an output (a control voltage) of the operational amplifier is connected to the negative remote sensing terminal.

In the power supply control circuit explained above, the operational amplifier is operated by a negative voltage and a positive voltage. Specifically, the negative voltage is output from a negative electrode terminal of an auxiliary power supply in which a positive electrode terminal is connected to the negative output terminal of the stabilized DC power supply. The positive voltage is output from the positive output terminal of the stabilized DC power supply. Further, the operational amplifier compares a voltage that is generated at the resistor when a current flowing in the load flows in the resistor (the resistor for current detection) with the first external control voltage that is divided so as to adjust the control voltage that is output to the negative remote sensing terminal. As a result, because constant current control by which the stabilized DC power supply performs a constant current operation is conducted, the current that flows in the load is controlled to be constant. According to the configuration explained above, the power supply control circuit can freely change a set current of the constant current control by changing the first external control voltage.

Further, JP 3683548 discloses another power supply control circuit in addition to the circuit explained above in which the stabilized DC power supply performs the constant current operation. Specifically, the other power supply control circuit has a circuit in which the stabilized DC power supply performs a constant voltage operation. The circuit in which the constant voltage operation is performed is configured with an operational amplifier, an input resistor and a feedback resistor. Specifically, the input resistor is connected between an inversion input terminal of the operational amplifier and the negative terminal of the load. The feedback resistor is connected between the inversion input terminal of the operational amplifier and an output terminal. Thus, the circuit explained above is configured as a non-inversion amplifier circuit that operates based on a voltage of the negative terminal of the load as a reference. Further, the operational amplifier of the non-inversion amplifier circuit also operates by the negative voltage and the positive voltage. The negative voltage is output from the negative electrode terminal of the auxiliary power supply in which the positive electrode terminal is connected to the negative output terminal of the stabilized DC power supply. The positive voltage is output from the positive output terminal of the stabilized DC power supply. As a result, the operational amplifier of the non-inversion amplifier circuit amplifies and outputs a second external control voltage that is divided by the resistor. The second external voltage is input based on the voltage of the negative terminal of the load as the reference.

In the power supply control circuit explained above, the output of the operational amplifier that configures the circuit in which the constant current operation is performed and the output of the operational amplifier that configures the circuit in which the constant voltage operation is performed are combined via a diode and makes the combined output as the control voltage that is output to the negative remote sensing terminal. As a result, because the output current and the output voltage of the stabilized DC power supply can be controlled by the first and second external control voltages, the stabilized DC power supply can be operated in a desired output state of a constant voltage and a constant current.

The power supply control circuit described above, however, still has some problems to be solved. Specifically, because the power supply control circuit explained above needs not only the voltage that is output from the auxiliary power supply but also the voltage that is output from the positive output terminal of the stabilized DC power supply as an operating voltage, problems such as the operation being unstable in a low voltage range of the voltage that is output from the stabilized DC power supply, may exist in the power supply control circuit.

SUMMARY

The present invention is accomplished in order to address these problems. An object of the present invention is to provide a power supply control circuit that can perform stable current control of a stabilized DC power supply even though an output voltage is low and to provide a power supply device that has this power supply control circuit.

In order to achieve the above object, a power supply control circuit according to one aspect of the present invention includes: the power supply control circuit being connected to a stabilized direct current power supply, the stabilized direct current power supply having a pair of first and second output terminals and a pair of first and second remote sensing terminals, the first output terminal having a positive potential relative to the second output terminal, the first remote sensing terminal having a positive potential relative to the second remote sensing terminal, the second output terminal being connected to the second remote sensing terminal, a voltage of the second remote sensing terminal being a reference potential; a current detector configured to detect an output current that is output from the stabilized direct current power supply, the output current being supplied toward a load that is connected to the pair of the first and second output terminals, the current detector configured to output a current detection voltage relative to the reference potential, the current detection voltage corresponding to the output current; a current difference output unit configured to output a current difference voltage, the current difference voltage corresponding to a voltage difference between the current detection voltage and a current setting voltage relative to the reference potential; a control voltage generator configured to generate a control voltage and output the control voltage to the first remote sensing terminal so as to perform a constant current control operation; and an auxiliary power supply configured to supply a direct current voltage to the current detector, the current difference output unit and the control voltage generator. The constant current control operation is to operate the stabilized direct current power supply in a constant current state by controlling a voltage value of the control voltage so as to make the current difference voltage approximately (close to) zero. Further, the current detector, the current difference output unit and the control voltage generator are operated by only the direct current voltage supplied by the auxiliary power supply.

Further, in the power supply control circuit according to the above aspect of the present invention, the power supply control circuit further includes: a voltage detector configured to detect an output voltage that is output from the stabilized direct current power supply, the output voltage being supplied toward the load, the voltage detector configured to output a voltage detection voltage relative to the reference potential, the voltage detection voltage corresponding to the output voltage; and a voltage difference output unit configured to output a voltage difference voltage, the voltage difference voltage corresponding to a voltage difference between the voltage detection voltage and a voltage setting voltage relative to the reference potential. The voltage detector and the voltage difference output unit are operated by only the direct current voltage supplied by the auxiliary power supply. Further, when the voltage detection voltage is lower than the voltage setting voltage, the control voltage generator performs the constant current control operation based on the voltage difference voltage. In addition, when the voltage detection voltage is equal to or greater than the voltage setting voltage, the control voltage generator performs a constant voltage control operation based on the voltage difference voltage. The constant voltage control operation is to operate the stabilized direct current power supply in a constant voltage state by controlling the voltage value of the control voltage so as to make the voltage detection voltage approximately (close to) the voltage setting voltage.

Further, a power supply device according to another aspect of the present invention includes the power supply control circuit according to the above aspects. The stabilized direct current power supply is configured to be controlled by the power supply control circuit.

In a power supply control circuit and a power supply device according to embodiments of the present invention, because the power supply control circuit is operated by only a stable direct current (DC) voltage that is supplied from an auxiliary power supply and performs constant current control for a stabilized DC power supply, the constant current control can be stably performed on the stabilized DC power supply even though an output voltage of the stabilized DC power supply is low.

Further, in the power supply control circuit and the power supply device according to embodiments of the present invention, because the power supply control circuit is operated by only the stable DC voltage that is supplied from the auxiliary power supply and performs constant voltage and current control for the stabilized DC power supply, the constant voltage and current control can be stably performed on the stabilized DC power supply even though the output voltage of the stabilized DC power supply is low.

DESCRIPTION OF EXEMPLARY EMBODIMENTS

A power supply device that has a power supply control circuit and a stabilized DC power supply, in which constant current control is performed by the power supply control circuit, according to embodiments of the present invention is explained below with reference to the drawings.

First Embodiment

Figure 1:
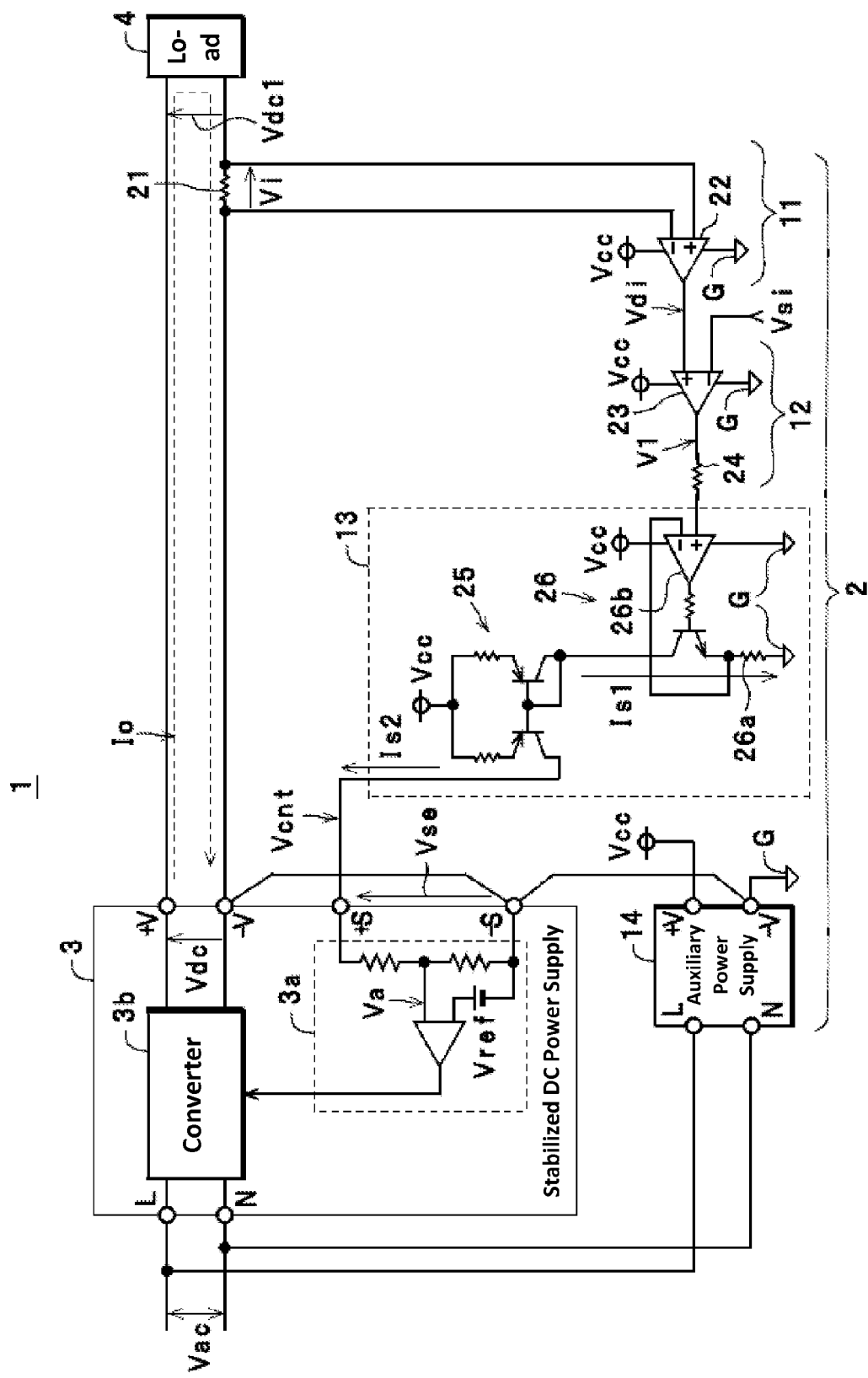
FIG. 1 is a circuit diagram that shows a power supply device 1 having a power supply control circuit 2 and a stabilized DC power supply 3 according to an embodiment of the present invention. The stabilized DC power supply 3 in which constant current control is performed by the power supply control circuit 2.

A power supply device 1 shown in FIG. 1 is configured with a power supply control circuit 2 and a stabilized DC power supply 3, in which constant current control is performed, by the power supply control circuit 2. Further, the power supply device 1 supplies an electric current to a load 4 that is connected to the stabilized DC power supply 3.

First, the stabilized DC power supply 3 that is controlled by the power supply control circuit 2 is explained. The stabilized DC power supply 3 has a pair of input terminals L and N, a pair of output terminals +V and −V, and a pair of remote sensing terminals +S and −S.

The stabilized DC power supply 3 is used by connecting the load 4 between the pair of the output terminals +V and −V via a wire. At the same time, though an illustration is omitted from the drawing, the stabilized DC power supply 3 is normally used by respectively connecting the output terminals +V and −V and the remote sensing terminals +S and −S by remote sensing lines (so that an applied voltage Vdc1 that is applied between both ends of the load 4 is input between the remote sensing terminals +S and −S).

In this case, as shown in FIG. 1, a comparison control circuit 3a that is provided in the stabilized DC power supply 3 compares a sense voltage Vse that is input between the remote sensing terminals +S and −S with a reference voltage Vref. Specifically, in this case, the sense voltage Vse corresponds to a divided voltage Va that is obtained by dividing the applied voltage Vdc1, which is input as the sense voltage Vse explained above, by a voltage division circuit (for instance, a voltage division circuit that has a high resistance resistor) at a predetermined division rate. According to comparison results, when the divided voltage Va is higher than the reference voltage Vref, the comparison control circuit 3a controls a converter 3b so as to decrease a DC voltage Vdc. Specifically, the converter 3b outputs a DC voltage Vdc based on an AC voltage Vac (for instance, a commercial AC voltage such as AC100V) that is input between the pair of the input terminals L and N. On the other hand, when the divided voltage Va is lower than the reference voltage Vref, the comparison control circuit 3a controls the converter 3b so as to increase the DC voltage Vdc.

Therefore, in the stabilized DC power supply 3, because the output terminals +V and −V and the remote sensing terminals +S and −S are respectively connected by the remote sensing lines, the DC voltage Vdc that is compensated by a voltage drop on the wire that connects the output terminals +V, −V and the load 4 is output. The applied voltage Vdc1 explained above is controlled to be a constant voltage that is defined in advance (a constant voltage that is defined by the division rate explained above and the reference voltage Vref).

Further, the converter 3b in the stabilized DC power supply 3 is configured with an overvoltage protection circuit and an overcurrent protection circuit (not shown). When the DC voltage Vdc reaches a maximum output voltage value Vmax, the DC voltage Vdc is maintained to be the maximum output voltage value Vmax by operating the overvoltage protection circuit. When a DC current Io that is supplied from the output terminals +V and −V to the load reaches a maximum output current value Imax, the DC current Io decreases by operating overcurrent protection circuit.

Next, the power supply control circuit 2 according to an embodiment of the present invention is explained with reference to the FIG. 1. The power supply control circuit 2 is externally attached/connected to the stabilized DC power supply 3. The power supply control circuit 2 is configured with a current detection unit 11, a current difference output unit 12, a control voltage generation unit 13 and an auxiliary power supply 14. In this case, the auxiliary power supply 14 is configured by a stabilized DC power supply that is separately provided from the stabilized DC power supply 3. The auxiliary power supply 14 generates a constant voltage that is defined in advance (a constant voltage is higher than the DC power voltage Vdc) based on an AC voltage Vac that is input between a pair of input terminals L and N thereof. At the same time, the auxiliary power supply 14 supplies an operating voltage Vcc as a DC voltage for the power supply control circuit 2 from a pair of output terminals +V and −V thereof to the power supply control circuit 2. That is, the power supply control circuit 2 is operated only by the operating voltage Vcc that is supplied from the auxiliary power supply 14. Further, when the DC voltage Vdcs, for instance, such as +24V or +48V, is higher as compared with the operating voltage Vcc (for instance, +5V-+15V) of an electronic part that configures the power supply control circuit 2, the DC voltage Vdc becomes higher than the output voltage of the auxiliary power supply 14 according to the above state. In this case, thought an illustration is omitted from the drawings, a configuration in which a simple power supply circuit (for instance, a three-terminal regulator circuit) is provided in the power supply control circuit 2 can be adopted. Thus, this power supply circuit generates the operating voltage Vcc based on the output voltage of the auxiliary power supply 14.

In the power supply device 1 explained above, the output terminal −V and the remote sensing terminal −S of the stabilized DC power supply 3, and the output terminal −V of the auxiliary power supply 14 are short-circuited and is regulated to a reference potential G (a ground potential). According to the configuration explained above, the auxiliary power supply 14 supplies the operating voltage Vcc to the power supply control circuit 2. The operating voltage Vcc has a relative value with respect to the reference potential G as a reference. Further, the stabilized DC power supply 3 also outputs the DC voltage Vdc that has a relative value with respect to the reference potential G as a reference.

The current detection unit 11 is operated by the operating voltage Vcc that is output from the auxiliary power supply 14. The current detection unit 11 detects the DC current (an output current) Io that is supplied from the stabilized DC power supply 3 to the load 4 that is connected between the pair of the output terminals +V and −V of the stabilized DC power supply 3. At the same time, the current detection unit 11 outputs a current detection voltage Vdi that has a relative value with respect to a potential (the reference potential G) of the output terminal −V located at a low potential side of the pair of the output terminals +V and −V. Specifically, the current detection voltage Vdi has a voltage value corresponding to a current value of the DC current Io. The current detection unit 11 is, as an example, configured with a current detection resistor (a resistance thereof is an extremely small resistance value) 21 and an amplifier 22. Specifically, the current detection resistor 21 is placed between the output terminal −V of the stabilized DC power supply 3 and the load 4. The amplifier 22 outputs a current detection voltage Vdi that is obtained by non-inversion amplifying a voltage Vi (a voltage having a relative value with respect to the reference potential G as a reference) that is generated between both ends of the current detection resistor 21 by flowing the output current Io.

The current difference output unit 12 is operated by the operating voltage Vcc that is output from the auxiliary power supply 14. The current difference output unit 12 outputs a current difference voltage V1 that is obtained by amplifying a difference between a current setting voltage Vsi and the current detection voltage Vdi by a large amplification rate. The current setting voltage Vsi has a relative value with respect to the reference potential G and corresponds to a voltage, which is input from outside of the current difference output unit 12, for setting a current. The current difference voltage V1 corresponds to a voltage difference between the voltages Vsi and Vdi and has a relative value with respect to the reference potential G. As an example, the current difference output unit 12 explained above is configured by an amplifier 23 in which the current detection voltage Vdi is input to a non-inversion input terminal and the current setting voltage Vsi is input to an inversion input terminal. Further, the amplifier 23 outputs the current difference voltage V1 as a positive voltage via an output resistor 24. The current difference voltage V1 has relative value with respect to the reference potential G.

The control voltage generation unit 13 is operated by the operating voltage Vcc that is output from the auxiliary power supply 14. While the control voltage generation unit 13 generates a control voltage Vcnt having a relative value with respect to the reference potential G and outputs the control voltage Vcnt to the remote sensing terminal +S on the high potential side of the pair of the remote sensing terminals +S and −S, the control voltage generation unit 13 controls a voltage value of the control voltage Vcnt so as to make a voltage value of the current difference voltage V1 that is output from the current difference output unit 12 approach zero volts. As a result, the control voltage generation unit 13 performs the constant current control in which the stabilized DC power supply 3 performs the constant current operation. In this case, in a state in which the DC current Io is controlled to be a constant current, when a resistance value of the current detection resistor 21 corresponds to R and an amplification rate of the amplifier 22 corresponds to a, formulas $Vi=Io \times R$, $Vdi=\alpha \times Vi$ and $Vdi=Vsi$ are satisfied. Therefore, the DC current Io is controlled as a constant current value Io1 ($Vsi/(\alpha \times R)$) that is defined by the current setting voltage Vsi.

In the embodiment of the present invention, the control voltage generation unit 13 is configured with a current mirror circuit 25 to which the operating voltage Vcc is supplied and a current source 26. Specifically, the current source 26 is connected between one transistor circuit (a right transistor circuit in FIG. 1) of a pair of transistor circuits that configures the current mirror circuit 25 and the reference potential G. On the other hand, the other transistor circuit (a left transistor circuit in FIG. 1) of the pair of the transistor circuits that configures the current mirror circuit 25 is connected to the remote sensing terminal +S. Further, the current source 26 is configured with a fixed resistor 26*a* in which one end is connected to the reference potential G and a voltage follower circuit 26*b*. Specifically, the voltage follower circuit 26*b* is placed between the other end of the fixed resistor 26*a* and the one transistor circuit explained above and applies the current difference voltage V1 that is output from the current difference output unit 12 to the other end of the fixed resistor 26*a* with low impedance. As a result, the current source 26 controls a current value of a current Is1 that flows in the other transistor circuit to be a current value that is obtained by dividing the current difference voltage V1 by a resistance value of the fixed resistor 26*a*.

According to the configuration explained above, a current Is2 in which its current value is the same as the current value of the current Is1 is also generated in the other transistor circuit of the current mirror circuit 25 in the control voltage generation unit 13. The control voltage generation unit 13 supplies the current Is2 to the remote sensing terminal +S of the stabilized DC power supply 3. At this time, because the current Is2 flows in the voltage division circuit (a circuit that divides the sense voltage Vse that is input between the remote sensing terminals +S and −S) that is provided in the stabilized DC power supply 3, the sense voltage Vse is generated between the remote sensing terminals +S and −S (that is, the control voltage Vcnt (the sense voltage Vse) is supplied from the control voltage generation unit 13 to the remote sensing terminal +S).

Next, an operation of the power supply device 1, i.e., a constant current control operation of the power supply control circuit 2 with respect to the stabilized DC power supply 3 is explained with reference to an example in which a battery as the load 4 (also referred to as "a battery 4" below) is charged in the power supply device 1. Further, a current value of an output current Io that is set based on a current setting voltage Vsi is defined to be less than a maximum output current value Imax. Further, a maximum output voltage value Vmax of the stabilized DC power supply 3 is defined in advance to be substantially equal to a charged voltage of the battery 4 at the time of full charge or to be somewhat lower than the charged voltage.

In the power supply device 1, when an AC voltage Vac is input, the stabilized DC power supply 3 and the auxiliary power supply 14 are operated so as to output an output voltage Vdc and an operating voltage Vcc. In this case, the auxiliary power supply 14 outputs the operating voltage Vcc, which is stabilized to a predetermined voltage value, to the power supply control circuit 2. As a result, the power supply control circuit 2 starts to perform a constant current control operation on the power supply control circuit 2.

Though the battery 4 is charged by a differential voltage between an applied voltage Vdc1 that is supplied from the stabilized DC power supply 3 and the charged voltage of the battery 4, an internal impedance of the battery 4 is originally low. Therefore, until the battery 4 almost reaches a full charge state, the output current Io tends to flow with a large current value.

On the other hand, in the power supply control circuit 2, first of all, as explained above, the current detection unit 11 detects the DC current Io that is supplied from the stabilized DC power supply 3 to the battery 4 and outputs a current detection voltage Vdi. Next, the current difference output unit 12 outputs a current difference voltage V1 that corresponds to a voltage difference between a current setting voltage Vsi and the current detection voltage Vdi. In the embodiment of the present invention, when the current detection voltage Vdi is higher than the current setting voltage Vsi, the current difference output unit 12 outputs the current difference voltage V1 of a positive voltage that is approximately (close to) the operating voltage Vcc. On the other hand, when the current detection voltage Vdi is lower than the current setting voltage Vsi, the current difference output unit 12 outputs the current difference voltage V1 of a positive voltage that is approximately (close to) the reference potential G.

Next, the control voltage generation unit 13 generates a current Is2 that has a current value corresponding to a voltage value of the current difference voltage V1 and outputs the current Is2 to the remote sensing terminal +S of the stabilized DC power supply 3. As a result, the control voltage generation unit 13 supplies a control voltage Vcnt to this remote sensing terminal +S.

In this case, when a current value of the DC current Io that is supplied from the stabilized DC power supply 3 to the battery 4 is larger than a current value Io1 that is defined by the current setting voltage Vsi, the current difference voltage V1 that is output from the current difference output unit 12 becomes a voltage (a high voltage) that is approximately the operating voltage Vcc because the current detection voltage Vdi is higher than the current setting voltage Vsi. Therefore, the control voltage generation unit 13 generates the current Is2 that has a current value corresponding to the high voltage value of the current difference voltage V1 and outputs the current Is2 to the remote sensing terminal +S of the stabilized DC power supply 3. As a result, the control voltage generation unit 13 generates the control voltage Vcnt of a high voltage value at the remote sensing terminal +S (the control voltage generation unit 13 supplies the control voltage Vcnt of the high voltage value to the remote sensing terminal +S).

In the stabilized DC power supply 3, a comparison control circuit 3*a* compares a divided voltage Va that is obtained by dividing the control voltage Vcnt and a reference voltage Vref. In this case, because the divided voltage Va is higher than the reference voltage Vref, the comparison control circuit 3a controls a converter 3b so as to decrease a DC voltage Vdc. As a result, a current value of the DC current Io that is supplied from the stabilized DC power supply 3 to the load 4 rapidly decreases.

Further, as a result of the above state in which the current value of the DC current Io decreases, when a current value of the DC current Io is smaller than the current value Io1 that is defined by the current setting voltage Vsi, the current detection voltage Vdi is smaller than the current setting voltage Vsi. As a result, the current difference voltage V1 that is output from the current difference output unit 12 becomes a voltage (a low voltage) that is approximately the reference potential G. Therefore, the control voltage generation unit 13 generates the current Is2 that has a current value corresponding to the low voltage value of the current difference voltage V1 and outputs the current Is2 to the remote sensing terminal +S of the stabilized DC power supply 3. As a result, the control voltage generation unit 13 generates the control voltage Vcnt of a low voltage value at the remote sensing terminal +S (the control voltage generation unit 13 supplies the control voltage Vcnt of the low voltage value to the remote sensing terminal +S).

In the stabilized DC power supply 3, the comparison control circuit 3a compares the divided voltage Va that is obtained by dividing the control voltage Vcnt and the reference voltage Vref. In this case, because the divided voltage Va is lower than the reference voltage Vref, the comparison control circuit 3a controls the converter 3b so as to increase the DC voltage Vdc. As a result, a current value of the DC current Io that is supplied from the stabilized DC power supply 3 to the load 4 rapidly increases.

As explained above, in the power supply device 1, when the current value of the DC current Io is larger than the current value Io1 that is defined by the current setting voltage Vsi, the power supply control circuit 2 decrease the DC voltage Vdc with respect to the stabilized DC power supply 3 by increasing the voltage value of the control voltage Vcnt that is output to the remote sensing terminal +S of the stabilized DC power supply 3. As a result, the current value of the DC current Io decreases. On the other hand, when the current value of the DC current Io is smaller than the current value Io1 that is defined by the current setting voltage Vsi, the power supply control circuit 2 increase the DC voltage Vdc with respect to the stabilized DC power supply 3 by decreasing the voltage value of the control voltage Vcnt that is output to the remote sensing terminal +S of the stabilized DC power supply 3. As a result, the current value of the DC current Io increases. As a result of repeating the control operations explained above, the power supply control circuit 2 performs the constant current control in which the current value of the DC current Io is the current value Io1 that is regulated by the current setting voltage Vsi. As a result, the power supply device 1 performs the constant current charging for the battery 4 with the DC current Io that has the constant current value Io1.

Thereafter, as the charging proceeds, though the charged voltage of the battery 4 increases, the power supply control circuit 2 continues to charge the battery 4 with the DC current Io that has the current value Io1 by continuing the control in which the DC voltage Vdc is somewhat higher than the charging voltage with respect to the stabilized DC power supply 3.

Further, when the DC voltage Vdc reaches the maximum output voltage value Vmax of the stabilized DC power supply 3, the stabilized DC power supply 3 maintains the voltage value of the DC voltage Vdc as the maximum output voltage value Vmax. As a result, the power supply control circuit 2 substantially stops the constant current control with respect to the stabilized DC power supply 3. Therefore, thereafter, until the battery 4 almost reaches the full charge state, the battery 4 is charged by the constant voltage. In this case, because a difference between the DC voltage Vdc and the charging voltage of the battery 4 gradually becomes smaller, the current value of the DC current Io gradually decreases.

Second Embodiment

Further, with respect to the power supply device 1 explained above, in the current difference output unit 12, the configuration in which the current detection voltage Vdi is input to the non-inversion input terminal of the amplifier 23 and the current setting voltage Vsi is input to the inversion input terminal of the amplifier 23 is adopted. However, as a power supply device 1A shown in FIG. 2, a configuration in which the current setting voltage Vsi is input to the non-inversion input terminal of the amplifier 23 and the current detection voltage Vdi is input to the inversion input terminal of the amplifier 23 can also be adopted. The power supply device 1A according to an embodiment of the present invention is explained below. The redundant explanations with respect to the same configurations as the power supply device 1 are omitted but the same reference numerals are used for labeling.

Figure 2:
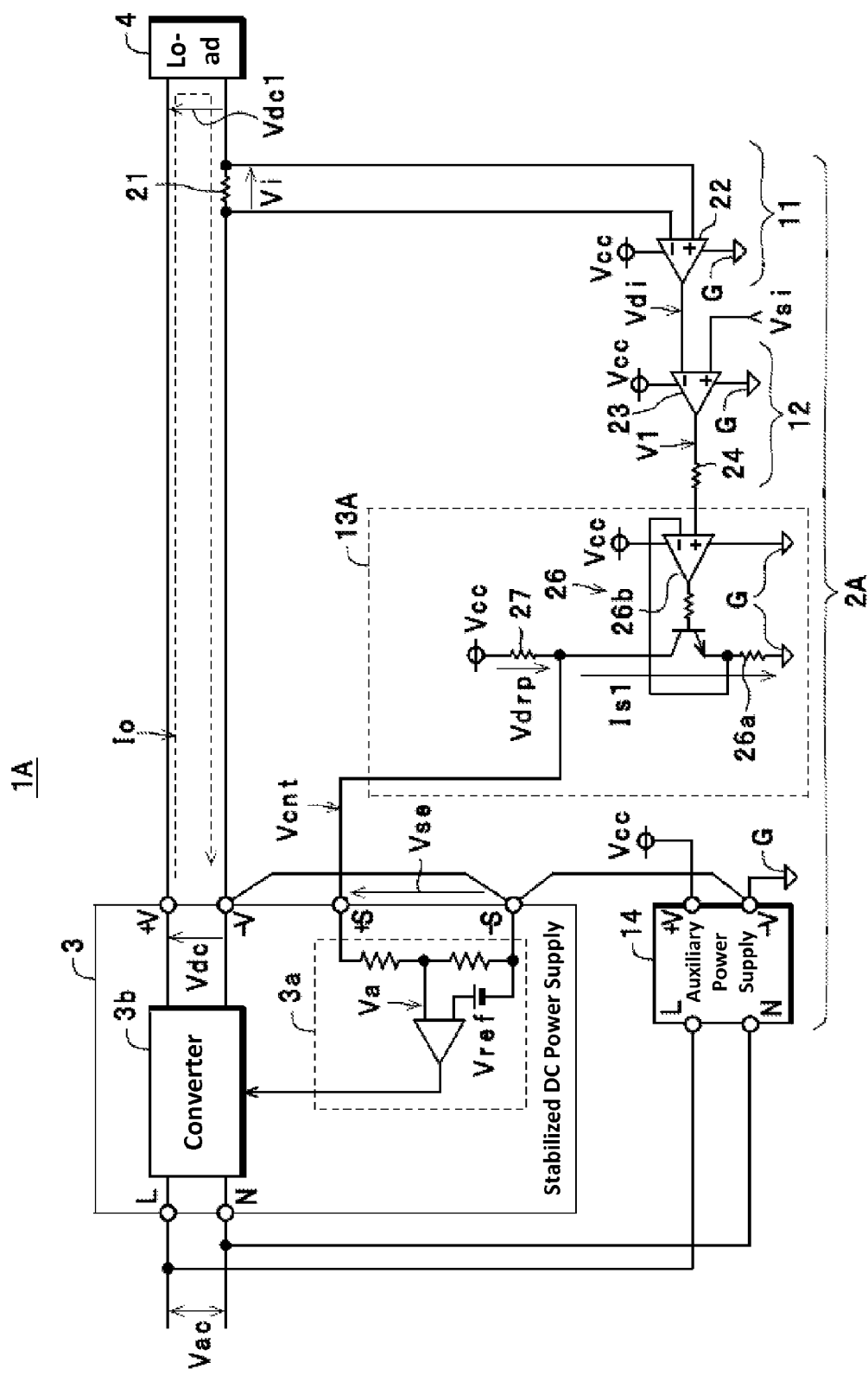
FIG. 2 is a circuit diagram that shows a power supply device 1A having a power supply control circuit 2A and a stabilized DC power supply 3 according to an embodiment of the present invention. The stabilized DC power supply 3 in which constant current control is performed by the power supply control circuit 2A.

The power supply device 1A shown in FIG. 2 is configured with a power supply control circuit 2A and the stabilized DC power supply 3 in which constant current control is performed by the power supply control circuit 2A. Further, as shown in FIG. 2, the power supply control circuit 2A is configured with the current detection unit 11, the current difference output unit 12, a control voltage generation unit 13A and the auxiliary power supply 14. In this case, as explained above, the current difference output unit 12 has the configuration in which the current setting voltage Vsi is input to the non-inversion input terminal of the amplifier 23 that configures the current difference output unit 12 and the current detection voltage Vdi is input to the inversion input terminal of the amplifier 23.

As an example, the control voltage generation unit 13A has a current source 26 and a fixed resistor 27 that is placed between an operating voltage Vcc and the current source 26. As a result of the configuration explained above, the control voltage generation unit 13A outputs a voltage (Vcc−Vdrp), which is obtained by subtracting a voltage drop (a voltage Vdrp) from the operating voltage Vcc, to a remote sensing terminal +S on a high potential side as a control voltage Vcnt. Specifically, the voltage drop Vdrp is generated at the fixed resistor 27 because a current Is1 flows into the fixed resistor 27.

Next, an operation of the power supply device 1A, i.e., a constant current control operation of the power supply control circuit 2 with respect to the stabilized DC power supply 3 is explained with reference to an example in which a battery 4 as a load 4 is charged in the power supply device 1A. Further, though the power supply device 1A and the power supply device 1 are different with respect to operations of the current difference output unit 12 and the control voltage generation unit 13A, operations of other components are the same. Therefore, the operations of the current difference output unit 12 and the control voltage generation unit 13A are mainly explained below.

In the power supply control circuit 2A, first of all, as explained above, the current detection unit 11 detects a DC current Io that is supplied from the stabilized DC power supply 3 to the battery 4 and outputs a current detection voltage Vdi. Next, the current difference output unit 12 outputs a current difference voltage V1 that corresponds to a voltage difference between a current setting voltage Vsi and the current detection voltage Vdi. In the embodiment of the present invention, when the current detection voltage Vdi is lower than the current setting voltage Vsi, the current difference output unit 12 outputs the current difference voltage V1 of a positive voltage that is approximately the operating voltage Vcc. On the other hand, when the current detection voltage Vdi is higher than the current setting voltage Vsi, the current difference output unit 12 outputs the current difference voltage V1 of a positive voltage that is approximately the reference potential G.

Next, the control voltage generation unit 13A generates the current Is1 in which a current value corresponds to a voltage value of the current difference voltage V1. As a result, the voltage drop (the voltage Vdrp) that corresponds to the voltage value of the current difference voltage V1 is generated in the fixed resistor 27. Thereafter, the control voltage generation unit 13A supplies (outputs) the voltage (Vcc−Vdrp), which is obtained by subtracting the voltage drop (the voltage Vdrp) from the operating voltage Vcc, to the remote sensing terminal +S on the high potential side as the control voltage Vcnt.

In this case, when a current value of the DC current Io that is supplied from the stabilized DC power supply 3 to the battery 4 is larger than a current value Io1 that is defined by the current setting voltage Vsi, the current difference voltage V1 that is output from the current difference output unit 12 becomes a positive voltage that is approximately the reference potential G because the current detection voltage Vdi is lower than the current setting voltage Vsi. Therefore, in the control voltage generation unit 13A, because the current source 26 makes a current value of the current Is1 decrease, the voltage drop (the voltage Vdrp) at the fixed resistor 27 decreases. As a result, the control voltage generation unit 13A supplies the control voltage Vcnt that has a high voltage value to the remote sensing terminal +S.

In the stabilized DC power supply 3, a comparison control circuit 3a compares a divided voltage Va that is obtained by dividing the control voltage Vcnt and a reference voltage Vref. In this case, because the divided voltage Va is higher than the reference voltage Vref, the comparison control circuit 3a controls a converter 3b so as to decrease a DC voltage Vdc. As a result, a current value of the DC current Io that is supplied from the stabilized DC power supply 3 to the load 4 rapidly decreases.

Further, as a result of the above state in which the current value of the DC current Io decreases, when a current value of the DC current Io is smaller than the current value Io1 that is defined by the current setting voltage Vsi, the current detection voltage Vdi is smaller than the current setting voltage Vsi. Thus, the current difference voltage V1 that is output from the current difference output unit 12 becomes a voltage (a high voltage) that is approximately the operating voltage Vcc. As a result, in the control voltage generation unit 13A, because the current source 26 makes a current value of the current Is1 increase, the voltage drop (the voltage Vdrp) at the fixed resistor 27 increases. As a result, the control voltage generation unit 13A supplies the control voltage Vcnt that has a low voltage value to the remote sensing terminal +S.

In the stabilized DC power supply 3, the comparison control circuit 3a compares the divided voltage Va that is obtained by dividing the control voltage Vcnt and the reference voltage Vref. In this case, because the divided voltage Va is lower than the reference voltage Vref, the comparison control circuit 3a controls the converter 3b so as to increase the DC voltage Vdc. As a result, a current value of the DC current Io that is supplied from the stabilized DC power supply 3 to the load 4 rapidly increases.

As explained above, in the power supply device 1A, when the current value of the DC current Io is larger than the current value Io1 that is defined by the current setting voltage Vsi, the power supply control circuit 2A decrease the DC voltage Vdc with respect to the stabilized DC power supply 3 by increasing the voltage value of the control voltage Vcnt that is output to the remote sensing terminal +S of the stabilized DC power supply 3. As a result, the current value of the DC current Io decreases. On the other hand, when the current value of the DC current Io is smaller than the current value Io1 that is defined by the current setting voltage Vsi, the power supply control circuit 2 increase the DC voltage Vdc with respect to the stabilized DC power supply 3 by decreasing the voltage value of the control voltage Vcnt that is output to the remote sensing terminal +S of the stabilized DC power supply 3. As a result, the current value of the DC current Io increases. As a result of repeating the control operations explained above, the power supply control circuit 2A performs the constant current control in which the current value of the DC current Io is the current value Io1 that is regulated by the current setting voltage Vsi. As a result, the power supply device 1A performs the constant current charging for the battery 4 with the DC current Io that has the constant current value Io1.

Thereafter, as the charging proceeds, though the charging voltage of the battery 4 increases, the power supply control circuit 2A continues to charge the battery 4 with the DC current Io that has the current value Io1 by continuing to perform the control in which the DC voltage Vdc is somewhat higher than the charging voltage to the stabilized DC power supply 3.

Further, when the DC voltage Vdc reaches the maximum output voltage value Vmax of the stabilized DC power supply 3, the stabilized DC power supply 3 makes the voltage value of the DC voltage Vdc stay in the maximum output voltage value Vmax. As a result, the power supply control circuit 2A substantially stops the constant current control with respect to the stabilized DC power supply 3. Therefore, thereafter, until the battery 4 almost reaches the full charge state, the battery 4 is charged with the constant voltage. In this case, because the difference between the DC voltage Vdc and the charging voltages of the battery 4 gradually becomes smaller, the current value of the DC current Io gradually decreases.

As explained above, in the power supply devices 1 and 1A, the power supply control circuits 2 and 2A are operated by only the operating voltage Vcc, which is supplied from the auxiliary power supply 14 and stabilized, and performs the constant current control on the stabilized DC power supply 3. Therefore, according to the power supply control circuits 2, 2A and the power supply devices 1, 1A that have the power supply control circuits 2 and 2A explained above, even when the DC voltage Vdc is low, the constant current control of the stabilized DC power supply 3 can be stably performed.

Third Embodiment

Figure 3:
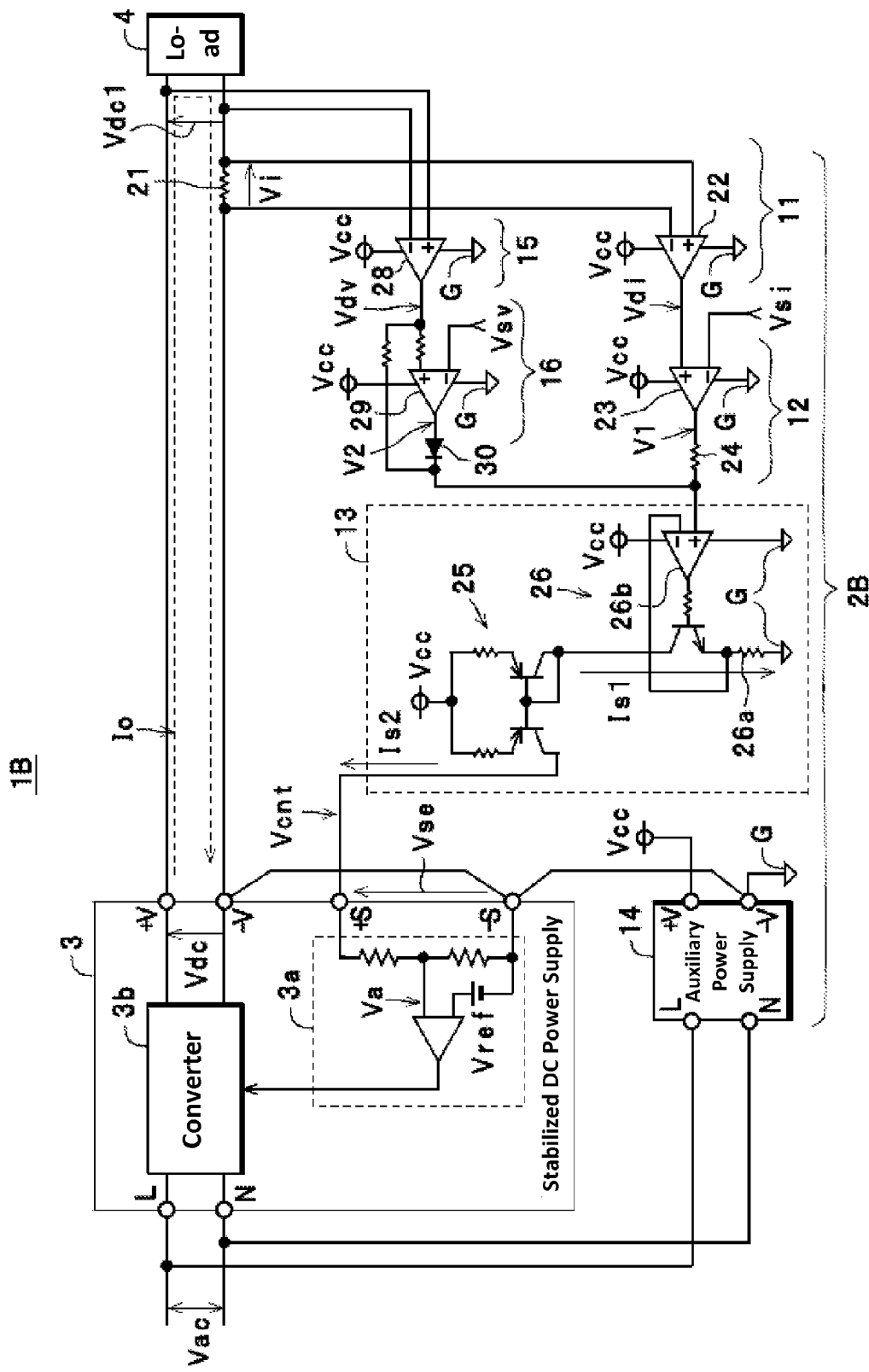
FIG. 3 is a circuit diagram that shows a power supply device 1B having a power supply control circuit 2B and a stabilized DC power supply 3 according to an embodiment of the present invention. The stabilized DC power supply 3 in which constant voltage and current control is performed by the power supply control circuit 2B.
Figure 4:
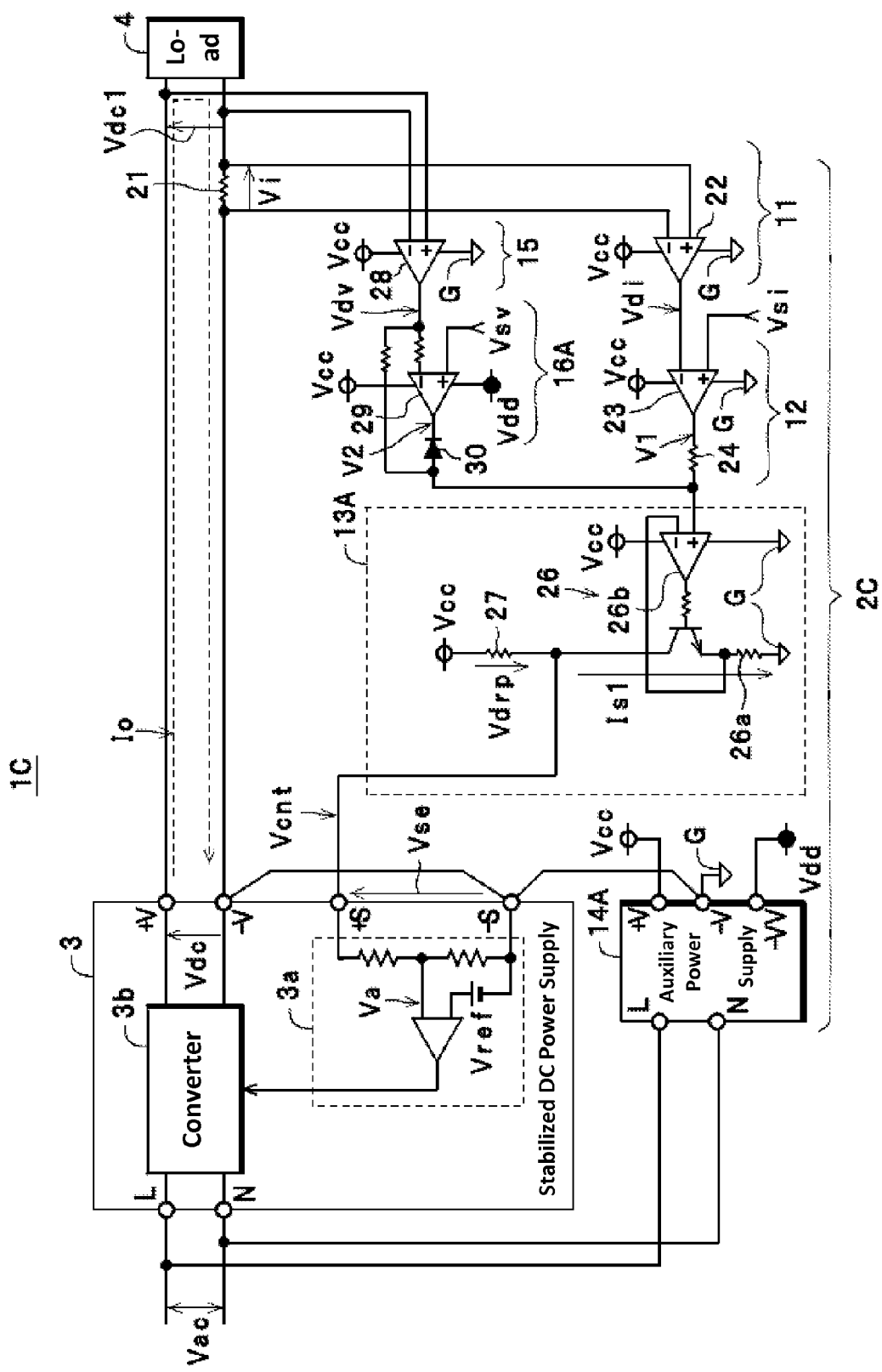
FIG. 4 is a circuit diagram that shows a power supply device 1C having a power supply control circuit 2C and a stabilized DC power supply 3 according to an embodiment of the present invention. The stabilized DC power supply 3 in which constant voltage and current control is performed by the power supply control circuit 2C.

Further, the power supply devices 1 and 1A explained above are respectively configured by the power supply control circuits 2 and 2A that perform only the constant current control of the constant current operations with respect to the stabilized DC power supply 3. However, it can also be adopted that power supply devices 1B and 1C as shown in FIGS. 3 and 4 are respectively configured by the power supply control circuits 2B and 2C that perform constant voltage and current control of constant voltage and current operations with respect to the stabilized DC power supply 3. The power supply devices 1B and 1C according to an embodiment of the present invention are explained below.

Further, with respect to the power supply device 1B, because the power supply control circuit 2B has the same components (the current detection unit 11, the current difference output unit 12, the control voltage generation unit 13 and the auxiliary power supply 14) of the power supply control circuit 2 in the power supply device 1, the redundant explanations with respect to the same components as the power supply device 1 are omitted but the same reference numerals are used for labeling. Further, with respect to the power supply device 1C, because the power supply control circuit 2C has the same components (the current detection unit 11, the current difference output unit 12 and the control voltage generation unit 13A) of the power supply control circuit 2A in the power supply device 1A, the redundant explanations with respect to the same components as the power supply device 1A are omitted but the same reference numerals are used for labeling.

First, the power supply device 1B shown in FIG. 3 is explained below. The power supply device 1B has the power supply control circuit 2B and the stabilized DC power supply 3 in which the constant voltage and current control is performed by the power supply control circuit 2B. Further, the power supply device 1B supplies an electric current to a load 4 that is connected to the stabilized DC power supply 3.

The power supply control circuit 2B is externally attached/connected to the stabilized DC power supply 3 and has the same components (the current detection unit 11, the current difference output unit 12, the control voltage generation unit 13 and the auxiliary power supply 14) of the power supply control circuit 2 of the power supply device 1. Further, at the same time, the power supply control circuit 2B has a voltage detection unit 15 and a voltage difference output unit 16. In this case, the voltage detection unit 15 and the voltage difference output unit 16 are operated only by the operating voltage Vcc that is supplied from the auxiliary power supply 14 in the same manner as the current detection unit 11, the current difference output unit 12 and the control voltage generation unit 13. That is, the power supply control circuit 2B is operated only by the operating voltage Vcc.

The voltage detection unit 15 detects an applied voltage Vdc1 that is applied from the stabilized DC power supply 3 to the load 4, and at the same time, outputs a voltage detection voltage Vdv. Specifically, the voltage detection voltage Vdv has a relative value with respect to the reference potential G and corresponds to a voltage value according to a voltage value of the applied voltage Vdc1. The voltage detection unit 15 has, as an example, an amplifier 28 that outputs a voltage detection voltage Vdv. The voltage detection voltage Vdv is obtained by non-inversion amplifying the applied voltage Vdc1 by the amplifier 28.

The voltage difference output unit 16 outputs a voltage difference voltage V2 that has a relative value with respect to the reference potential G. The voltage difference voltage V2 corresponds to a voltage difference between a voltage setting voltage Vsv (a voltage for voltage setting that is input to the voltage difference output unit 16 from outside of the voltage difference output unit 16) that has a relative value with respect to the reference potential G and the voltage detection voltage Vdv. The voltage difference output unit 16 explained above, as an example, has an amplifier 29 in which the voltage detection voltage Vdv is input to a non-inversion input terminal and the voltage setting voltage Vsv is input to an inversion input terminal. In this case, the amplifier 29 outputs the voltage difference voltage V2 as a positive voltage having a relative value with respect to the reference potential G to a node via a diode 30 from which the current difference voltage V1 from the current difference output unit 12 is output (an input of the current source 26 in the control voltage generation unit 13).

Next, an operation of the power supply device 1B, i.e., a constant voltage and current control operation of the power supply control circuit 2B with respect to the stabilized DC power supply 3 is explained with reference to an example in which a battery 4 as the load 4 is charged in the power supply device 1B. Further, because the power supply device 1B is the same as the power supply device 1 with respect to the constant current control operation for the stabilized DC power supply 3 by the power supply control circuit 2B, a constant voltage control operation with respect to the stabilized DC power supply 3 by the power supply control circuit 2B is mainly explained below. Further, under a condition in which the DC voltage Vdc of the stabilized DC power supply 3 has a predetermined upper limit voltage Vhi that is less than a maximum output voltage value Vmax, the voltage setting voltage Vsv is defined in advance so as to make the voltage detection voltage Vdv that is output from the voltage detection unit 15 reaches the voltage setting voltage Vsv.

In the power supply control circuit 2B, before the DC voltage Vdc of the stabilized DC power supply 3 reaches the upper limit voltage Vhi, the voltage detection voltage Vdv that is output from the voltage detection unit 15 is less than the voltage setting voltage Vsv. In this case, though the voltage difference output unit 16 outputs the voltage difference voltage V2 that corresponds to the voltage difference between the voltage setting voltage Vsv and the voltage detection voltage Vdv, the voltage difference voltage V2 has a positive voltage that is approximately the reference potential G because the voltage detection voltage Vdv is lower than the voltage setting voltage Vsv. As a result, because the diode 30 of the voltage difference output unit 16 becomes in a reverse bias state, only the current difference voltage V1 that is output from the current difference output unit 12 is input to the current source 26 of the control voltage generation unit 13.

Therefore, before the DC voltage Vdc of the stabilized DC power supply 3 reaches the upper limit voltage Vhi, the power supply device 1B performs the constant current charging for the battery 4 with the DC current Io that has the constant current value Io1 in the same manner as the power supply device 1 because the power supply control circuit 2B performs the constant current control in which the current value of the DC current Io is the current value Io1 that is regulated by the current setting voltage Vsi in the same manner as the power supply control circuit 2.

Thereafter, as the charging proceeds, though the charging voltage of the battery 4 increases, the power supply control circuit 2B continues to charge the battery 4 with the DC current Io that has the current value Io1 by continuing the control in which the DC voltage Vdc is somewhat higher than the charging voltage with respect to the stabilized DC power supply 3.

Further, when the DC voltage Vdc of the stabilized DC power supply 3 reaches the upper limit voltage Vhi, the voltage detection voltage Vdv that is output from the voltage detection unit 15 is more than the voltage setting voltage Vsv. The voltage difference output unit 16 outputs the voltage difference voltage V2 that corresponds to the voltage difference between the voltage setting voltage Vsv and the voltage detection voltage Vdv. In this case, the voltage difference voltage V2 has a positive voltage that is approximately the operating voltage Vcc. In this state, because the diode 30 of the voltage difference output unit 16 becomes in a positive bias state, the voltage difference voltage V2 that is output from the voltage difference output unit 16 is mainly output to the current source 26 of the control voltage generation unit 13 instead of the current difference voltage V1 that is output from the current difference output unit 12.

In this case, when the DC voltage Vdc is higher than the upper limit voltage Vhi, the voltage detection voltage Vdv is higher than the voltage setting voltage Vsv. As a result, the voltage difference voltage V2 that is output from the voltage difference output unit 16 becomes a voltage (a high voltage) that is approximately the operating voltage Vcc. Therefore, the control voltage generation unit 13 generates the current Is2 in which a current value corresponds to the high voltage value of the voltage difference voltage V2 and outputs the current Is2 to the remote sensing terminal +S of the stabilized DC power supply 3. As a result, the control voltage generation unit 13 generates a control voltage Vcnt having a high voltage value at the remote sensing terminal +S (the control voltage generation unit 13 supplies the control voltage Vcnt having a high voltage value to the remote sensing terminal +S).

In the stabilized DC power supply 3, a comparison control circuit 3a compares a divided voltage Va that is obtained by dividing the control voltage Vcnt and a reference voltage Vref. In this case, because the divided voltage Va is higher than the reference voltage Vref, the comparison control circuit 3a controls a converter 3b so as to decrease the DC voltage Vdc. As a result, a voltage value of the applied voltage Vdc1 that is supplied from the stabilized DC power supply 3 to the load 4 decreases.

Further, as a result of the above state in which the voltage value of the applied voltage Vdc1 that is supplied to the load 4 decreases, when the DC voltage Vdc is lower than the upper limit voltage Vhi, the voltage detection voltage Vdv is lower than the voltage setting voltage Vsv. As a result, the voltage difference voltage V2 that is output from voltage difference output unit 16 becomes a voltage (a low voltage) that is approximately the reference potential G. Therefore, the control voltage generation unit 13 generates the current Is2 in which a current value thereof corresponds to the low voltage value of the voltage difference voltage V2 and outputs the current Is2 to the remote sensing terminal +S of the stabilized DC power supply 3. As a result, the control voltage generation unit 13 generates the control voltage Vcnt having a low voltage value at the remote sensing terminal +S (the control voltage generation unit 13 supplies the control voltage Vcnt having a low voltage value to the remote sensing terminal +S).

In the stabilized DC power supply 3, the comparison control circuit 3a compares the divided voltage Va that is obtained by dividing the control voltage Vcnt and the reference voltage Vref. In this case, because the divided voltage Va is lower than the reference voltage Vref, the comparison control circuit 3a controls the converter 3b so as to increase the DC voltage Vdc. As a result, a voltage value of the applied voltage Vdc1 that is supplied from the stabilized DC power supply 3 to the load 4 increases.

As explained above, in the power supply device 1B, after the DC voltage Vdc reaches the upper limit voltage Vhi of the stabilized DC power supply 3, when the DC voltage Vdc is higher than the upper limit voltage Vhi, the power supply control circuit 2B increases the voltage value of the control voltage Vcnt that is output to the remote sensing terminal +S of the stabilized DC power supply 3. As a result, the DC voltage Vdc of the stabilized DC power supply 3 decreases. On the other hand, when the DC voltage Vdc is lower than the upper limit voltage Vhi, the power supply control circuit 2B decreases the voltage value of the control voltage Vcnt that is output to the remote sensing terminal +S of the stabilized DC power supply 3. As a result, the DC voltage Vdc of the stabilized DC power supply 3 increases. As the result of repeating the control operations explained above, the power supply control circuit 2B performs the constant voltage control in which the DC voltage Vdc is the upper limit voltage Vhi. Therefore, after the DC voltage Vdc reaches the upper limit voltage Vhi of the stabilized DC power supply 3, the power supply device 1B performs the constant voltage charging for the battery 4 with the constant upper limit voltage Vhi. In this case, because a difference between the DC voltage Vdc and the charging voltage of the battery 4 becomes gradually smaller, the current value of the DC current Io gradually decreases.

Fourth Embodiment

Next, a power supply device 1C shown in FIG. 4 is explained below. The power supply device 1C is configured with a power supply control circuit 2C and a stabilized DC power supply 3 in which constant voltage and current control is performed by the power supply control circuit 2C. The power supply device 1C supplies an electric current to a load 4 that is connected to the stabilized DC power supply 3. Further, the redundant explanations with respect to the same components as the power supply device 1B are omitted but the same reference numerals are used for labeling.

The power supply control circuit 2C is externally attached/connected to the stabilized DC power supply 3 and has the components (the current detection unit 11, the current difference output unit 12 and the control voltage generation unit 13A) of the power supply control circuit 2A of the power supply device 1A. Further, at the same time, the power supply control circuit 2C has an auxiliary power supply 14A, a voltage detection unit 15 and a voltage difference output unit 16A.

In this case, the auxiliary power supply 14A corresponds to a stabilized DC power supply and outputs an operating voltage Vcc of a positive voltage that has a relative value with respect to the reference potential G. The auxiliary power supply 14A also outputs an operating voltage Vdd of a negative voltage (a DC voltage) that has a relative value with respect to the reference potential G from an output terminal −VV. Further, though an illustration is omitted from the drawing, the auxiliary power supply 14A can also be configured with the auxiliary power supply 14 explained in the embodiments and a negative voltage converter. Specifically, the negative voltage converter outputs the operating voltage Vdd based on the operating voltage Vcc that is output from the auxiliary power supply 14.

The voltage difference output unit 16A outputs a voltage difference voltage V2 that has a relative value with respect to the reference potential G. The voltage difference voltage V2 corresponds to a voltage difference between a voltage setting voltage Vsv (a voltage for voltage setting that is input to the voltage difference output unit 16 from outside of the voltage difference output unit 16) that has a relative value with respect to the reference potential G and the voltage detection voltage Vdv. The voltage difference output unit 16A explained above, as an example, has an amplifier 29 in which the voltage detection voltage Vdv is input to an inversion input terminal and the voltage setting voltage Vsv is input to a non-inversion input terminal. In this case, the amplifier 29 operates by being supplied with an operating voltage Vdd along with an operating voltage Vcc and outputs the voltage difference voltage V2 to a node via a diode 30 from which the current difference voltage V1 from the current difference output unit 12 is output (an input of the current source 26 in the control voltage generation unit 13).

Next, an operation of the power supply device 1C, i.e., a constant voltage and current control operation of the power supply control circuit 2C with respect to the stabilized DC power supply 3 is explained with reference to an example in which a battery 4 as the load 4 is charged in the power supply device 1C. Further, because the power supply device 1C is the same as the power supply device 1A with respect to the constant current control operation for the stabilized DC power supply 3 by the power supply control circuit 2C, a constant voltage control operation with respect to the stabilized DC power supply 3 by the power supply control circuit 2C is mainly explained below.

In the power supply control circuit 2C, before the DC voltage Vdc of the stabilized DC power supply 3 reaches the upper limit voltage Vhi, the voltage detection voltage Vdv that is output from the voltage detection unit 15 is less than the voltage setting voltage Vsv. In this case, because the voltage detection voltage Vdv is lower than the voltage setting voltage Vsv, the voltage difference output unit 16 outputs the voltage difference voltage V2, which corresponds to the voltage difference between the voltage setting voltage Vsv and the voltage detection voltage Vdv, of a positive voltage that is approximately the operating voltage Vcc. As a result, because the diode 30 of the voltage difference output unit 16 becomes in a reverse bias state, only the current difference voltage V1 that is output from the current difference output unit 12 is input to the current source 26 of the control voltage generation unit 13.

Therefore, before the DC voltage Vdc of the stabilized DC power supply 3 reaches the upper limit voltage Vhi, the power supply device 1C performs the constant current charging for the battery 4 with the DC current Io that has the constant current value Io1 in the same manner as the power supply device 1A because the power supply control circuit 2C performs the constant current control in which the current value of the DC current Io is the current value Io1 that is regulated by the current setting voltage Vsi in the same manner as the power supply control circuit 2A.

Thereafter, as the charging proceeds, though the charging voltage of the battery 4 increases, the power supply control circuit 2C continues to charge the battery 4 with the DC current Io that has the current value Io1 by continuing the control in which the DC voltage Vdc is somewhat higher than the charging voltage with respect to the stabilized DC power supply 3.

Further, when the DC voltage Vdc of the stabilized DC power supply 3 reaches the upper limit voltage Vhi, the voltage detection voltage Vdv that is output from the voltage detection unit 15 is more than the voltage setting voltage Vsv. The voltage difference output unit 16 outputs the voltage difference voltage V2 that corresponds to the voltage difference between the voltage setting voltage Vsv and the voltage detection voltage Vdv. In this case, the voltage difference voltage V2 has a negative voltage. In this state, because the diode 30 of the voltage difference output unit 16 becomes in a positive bias state, the voltage difference voltage V2 that is output from the voltage difference output unit 16 is mainly output to the current source 26 of the control voltage generation unit 13 instead of the current difference voltage V1 that is output from the current difference output unit 12.

In this case, as explained above, when the DC voltage Vdc is higher than the upper limit voltage Vhi, the voltage detection voltage Vdv is higher than the voltage setting voltage Vsv. As a result, the voltage difference voltage V2 that is output from the voltage difference output unit 16 becomes the negative voltage. As a result, in the control voltage generation unit 13A, because the current source 26 makes the current value of the current Is1 decrease, the voltage drop (the voltage Vdrp) in the fixed resistor 27 decreases. Therefore, the control voltage generation unit 13A supplies the control voltage Vcnt that has a high voltage value to the remote sensing terminal +S.

In the stabilized DC power supply 3, a comparison control circuit 3a compares a divided voltage Va that is obtained by dividing the control voltage Vcnt and a reference voltage Vref. In this case, because the divided voltage Va is higher than the reference voltage Vref, the comparison control circuit 3a controls a converter 3b so as to decrease the DC voltage Vdc. As a result, a voltage value of the applied voltage Vdc1 that is supplied from the stabilized DC power supply 3 to the load 4 decreases.

Further, as a result of the above state in which the voltage value of the applied voltage Vdc1 that is supplied to the load 4 decreases, when the DC voltage Vdc is lower than the upper limit voltage Vhi, the voltage detection voltage Vdv is lower than the voltage setting voltage Vsv. As a result, the voltage difference voltage V2 that is output from voltage difference output unit 16 becomes a voltage (a high voltage) that is approximately the operating voltage Vcc. Therefore, in the control voltage generation unit 13A, because the current source 26 makes the current value of the current Is1 increase, the voltage drop (the voltage Vdrp) in the fixed resistor 27 increases. As a result, the control voltage generation unit 13A supplies the control voltage Vcnt that has a low voltage value to the remote sensing terminal +S.

In the stabilized DC power supply 3, the comparison control circuit 3a compares the divided voltage Va that is obtained by dividing the control voltage Vcnt and the reference voltage Vref. In this case, because the divided voltage Va is lower than the reference voltage Vref, the comparison control circuit 3a controls the converter 3b so as to increase the DC voltage Vdc. As a result, a voltage value of the applied voltage Vdc1 that is supplied from the stabilized DC power supply 3 to the load 4 increases.

As explained above, in the power supply device 1C, after the DC voltage Vdc reaches the upper limit voltage Vhi of the stabilized DC power supply 3, when the DC voltage Vdc is higher than the upper limit voltage Vhi, the power supply control circuit 2C also increases the voltage value of the control voltage Vcnt that is output to the remote sensing terminal +S of the stabilized DC power supply 3. As a result, the DC voltage Vdc of the stabilized DC power supply 3 decrease. On the other hand, when the DC voltage Vdc is lower than the upper limit voltage Vhi, the power supply control circuit 2C decreases the voltage value of the control voltage Vcnt that is output to the remote sensing terminal +S of the stabilized DC power supply 3. As a result, the DC voltage Vdc of the stabilized DC power supply 3 increases. As the result of repeating the control operations explained above, the power supply control circuit 2C performs the constant voltage control in which the DC voltage Vdc is the upper limit voltage Vhi. Therefore, after the DC voltage Vdc reaches the upper limit voltage Vhi of the stabilized DC power supply 3, the power supply device 1C performs the constant voltage charging for the battery 4 with the constant upper limit voltage Vhi. In this case, because a difference between the DC voltage Vdc and the charging voltage of the battery 4 becomes gradually smaller, the current value of the DC current Io gradually decreases.

As explained above, in the power supply devices 1B, the power supply control circuit 2B is operated only by the operating voltage Vcc which is supplied from the auxiliary power supply 14. Similarly, in the power supply devices 1C, the power supply control circuit 2C is operated only by the operating voltages Vcc and Vdd which are supplied from the auxiliary power supply 14A. Thus, the constant voltage and current control with respect to the stabilized DC power supply 3 is performed. Therefore, according to the power supply control circuits 2B and 2C, and the power supply devices 1B and 1C that respectively have the power supply control circuits 2B and 2C explained above, even when the DC voltage Vdc is a low voltage value, the constant voltage and current control with respect to the stabilized DC power supply 3 can be stably performed.

The power supply control circuit and the power supply device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A power supply control circuit, comprising:
the power supply control circuit being connected to a stabilized direct current power supply, the stabilized direct current power supply having:
  a pair of first and second output terminals and a pair of first and second remote sensing terminals,
  the first output terminal having a positive potential relative to the second output terminal,
  the first remote sensing terminal having a positive potential relative to the second remote sensing terminal,
  the second output terminal being connected to the second remote sensing terminal, and
  a voltage of the second remote sensing terminal being a reference potential;
a current detector configured to detect an output current that is output from the stabilized direct current power supply, the output current being supplied toward a load that is connected to the pair of the first and second output terminals, the current detector being configured to output a current detection voltage relative to the reference potential, the current detection voltage corresponding to the output current;
a current difference output unit configured to output a current difference voltage, the current difference voltage corresponding to a voltage difference between the current detection voltage and a current setting voltage relative to the reference potential;
a control voltage generator configured to generate a control voltage and output the control voltage to the first remote sensing terminal so as to perform a constant current control operation; and
an auxiliary power supply configured to supply a direct current voltage to the current detector, the current difference output unit and the control voltage generator, wherein
the constant current control operation is configured to operate the stabilized direct current power supply in a constant current state by controlling a voltage value of the control voltage so as to make the current difference voltage approximately zero, and
the current detector, the current difference output unit and the control voltage generator are operated by only the direct current voltage supplied only by the auxiliary power supply.

2. A power supply device, comprising:
the power supply control circuit according to claim 1; and
the stabilized direct current power supply configured to be controlled by the power supply control circuit.

3. The power supply control circuit according to claim 1, further comprising:
a voltage detector configured to detect an output voltage that is output from the stabilized direct current power supply, the output voltage being supplied toward the load, the voltage detector configured to output a voltage detection voltage relative to the reference potential, the voltage detection voltage corresponding to the output voltage; and
a voltage difference output unit configured to output a voltage difference voltage, the voltage difference voltage corresponding to a voltage difference between the voltage detection voltage and a voltage setting voltage relative to the reference potential, wherein
the voltage difference output unit is operated by only the direct current voltage supplied only by the auxiliary power supply,
when the voltage detection voltage is lower than the voltage setting voltage, the control voltage generator performs the constant current control operation based on the voltage difference voltage, and
when the voltage detection voltage is equal to or greater than the voltage setting voltage, the control voltage generator performs a constant voltage control operation based on the voltage difference voltage, and the constant voltage control operation operates the stabilized direct current power supply in a constant voltage state by controlling the voltage value of the control voltage so as to make the voltage detection voltage approximately the voltage setting voltage.

4. A power supply device, comprising:
the power supply control circuit according to claim 3; and
the stabilized direct current power supply configured to be controlled by the power supply control circuit.

5. A power supply control circuit, comprising:
the power supply control circuit being connected to a stabilized direct current power supply, the stabilized direct current power supply having:
  a pair of first and second output terminals and a pair of first and second remote sensing terminals,
  the first output terminal having a positive potential relative to the second output terminal,
  the first remote sensing terminal having a positive potential relative to the second remote sensing terminal,
  the second output terminal being connected to the second remote sensing terminal, and
  a voltage of the second remote sensing terminal being a reference potential;
a current detector configured to detect an output current that is output from the stabilized direct current power supply, the output current being supplied toward a load that is connected to the pair of the first and second output terminals, the current detector being configured to output a current detection voltage relative to the reference potential, the current detection voltage corresponding to the output current;
a current difference output unit configured to output a current difference voltage, the current difference voltage corresponding to a voltage difference between the current detection voltage and a current setting voltage relative to the reference potential;

a control voltage generator configured to generate a control voltage and output the control voltage to the first remote sensing terminal so as to perform first and second control operations; and an auxiliary power supply configured to supply a direct current voltage to the current detector, the current difference output unit and the control voltage generator, wherein the control voltage generator is configured to operate the stabilized direct current power supply in a constant current state based on the current difference voltage by repeating the first and second control operations:

in the first control operation, when the control voltage generator detects that the current detection voltage is larger than the current setting voltage, the control voltage generator is configured to increase a voltage value of the control voltage so as to make the stabilized direct current power supply decrease a current value of the output current; and in the second control operation, when the control voltage generator detects that the current detection voltage is smaller than the current setting voltage, the control voltage generator is configured to decrease the voltage value of the control voltage so as to make the stabilized direct current power supply increase the current value of the output current, and the current detector, the current difference output unit and the control voltage generator are operated by only the direct current voltage supplied only by the auxiliary power supply.

6. A power supply device, comprising:
the power supply control circuit according to claim 5; and
the stabilized direct current power supply configured to be controlled by the power supply control circuit.

7. The power supply control circuit according to claim 5, further comprising:

a voltage detector configured to detect an output voltage that is output from the stabilized direct current power supply, the output voltage being supplied toward the load, the voltage detector configured to output a voltage detection voltage relative to the reference potential, the voltage detection voltage corresponding to the output voltage; and a voltage difference output unit configured to output a voltage difference voltage, the voltage difference voltage corresponding to a voltage difference between the voltage detection voltage and a voltage setting voltage relative to the reference potential, wherein the voltage difference output unit is operated by only the direct current voltage supplied only by the auxiliary power supply, the control voltage generator is configured to operate the stabilized direct current power supply in a constant current state based on the voltage difference voltage by repeating the first and second control operations:

in the first control operation, when the control voltage generator detects that the voltage detection voltage is larger than the voltage setting voltage, the control voltage generator is configured to increase the voltage value of the control voltage so as to make the stabilized direct current power supply decrease a voltage value of the output voltage; and in the second control operation, when the control voltage generator detects that the voltage detection voltage is smaller than the voltage setting voltage, the control voltage generator is configured to decrease the voltage value of the control voltage so as to make the stabilized direct current power supply increase the voltage value of the output voltage.

8. A power supply device, comprising:
the power supply control circuit according to claim 7; and
the stabilized direct current power supply configured to be controlled by the power supply control circuit.

* * * * *